(12) United States Patent
Siomkos et al.

(10) Patent No.: US 6,259,902 B1
(45) Date of Patent: Jul. 10, 2001

(54) DUAL CHANNEL SUPERHETERODYNE RECEIVER

(75) Inventors: John Robert Siomkos, Royal Palm Beach; Edgar Herbert Callaway, Jr., Boca Raton, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/181,760

(22) Filed: Oct. 29, 1998

(51) Int. Cl.[7] .................................................. H04B 1/18
(52) U.S. Cl. .................................. 455/190.1; 455/196.1; 455/189.1; 455/180.1; 455/180.2
(58) Field of Search .......................... 455/190.1, 196.1, 455/189.1, 180.1, 180.2, 180.3, 188.1, 188.2, 199.1, 280, 338, 339, 553, 552

(56) References Cited

U.S. PATENT DOCUMENTS

| 5,027,430 | * | 6/1991 | Yamauchi et al. | 455/188 |
| 5,054,052 | | 10/1991 | Nonami . | |
| 5,280,636 | * | 1/1994 | Kelley et al. | 455/131 |
| 5,794,159 | * | 8/1998 | Portin | 455/553 |
| 5,852,784 | * | 12/1998 | Ito et al. | 455/552 |
| 5,883,597 | * | 3/1999 | Dewulf | 342/357 |
| 5,889,493 | * | 3/1999 | Endo | 342/357 |
| 6,044,251 | * | 3/2000 | Brekelmans | 455/150.1 |
| 6,081,691 | * | 6/2000 | Renard et al. | 455/12.1 |

* cited by examiner

*Primary Examiner*—Daniel Hunter
*Assistant Examiner*—Lana Le
(74) *Attorney, Agent, or Firm*—Randi L. Dulaney

(57) ABSTRACT

A dual channel receiver (100) includes a front end bandpass filter (120) that has a front end bandwidth, a first mixer (130), a second mixer (135), and two essentially identical receiver back ends (190, 195). The front end bandpass filter splits a received signal into a first signal (121) and a second signal (122) of essentially equal signal strengths and provides out of band isolation between first and second signal outputs (123, 124). The first mixer is coupled to the first signal and to a high side injection signal (131), and generates a first mixer output signal (132). The second mixer is coupled to the second signal and to a low side injection signal (136), and generates a second mixer output signal (137). Each of the two essentially identical receiver back ends is coupled to one of the first and second mixer output signals.

1 Claim, 3 Drawing Sheets

DUAL CHANNEL SUPERHETERODYNE RECEIVER

FIELD OF THE INVENTION

This invention relates to electronic receiving equipment, and in particular to superheterodyne receivers for simultaneously receiving two channels within a transmission band.

BACKGROUND OF THE INVENTION

Channeled communication systems include systems such as selective call radio communication systems, cable distribution systems, and infrared communication systems. Some selective call radio communication systems, such as paging systems, are multichannel systems in which differing types of information are transmitted on different channels within a transmission band. An example of such a system is a paging system in which one or more information service channels are used to distribute information from information services and one or more messaging channels are used to distribute normal paging messages generated by a variety of originators. Information services provide information such as stock market quotations and scores of sporting events. Some paging subscribers in such a paging system have a desire to simultaneously receive both paging messages intended for the subscriber and some portion of the information available on one of the information service channels. While it is theoretically possible to organize the paging messages and the portion of the information that the subscriber desires so that the subscriber obtains both by using a conventional receiver that switches between two channels, in practice it is very difficult to organize the messages and information in two channels, in systems having any but the fewest number of users. From a subscriber's perspective, this situation can lead to lost information and delayed paging messages, and from the system operator's perspective, this results in unhappy customers and lost revenue.

A potential solution to this problem is to provide a pager that uses two conventional receivers, allowing simultaneous recovery of the information service information and the paging messages, but this approach has drawbacks. When two conventional single channel superheterodyne receivers are used in one pager, local oscillator signals generated in each receiver can interfere with the operation of the other receiver, particularly at certain combinations of channel frequencies. The interference is likely to be severe enough to prevent the receivers from maintaining a locked tuning condition. Furthermore, two antennas would be used, greatly increasing the size of the two channel pager.

Thus, what is needed is a dual channel receiver for use in a communication system that is economical in both size and cost, and that works with all combinations of channels within a band.

DETAILED DESCRIPTION OF THE PREFERRED EMBODIMENT

Figure 1:
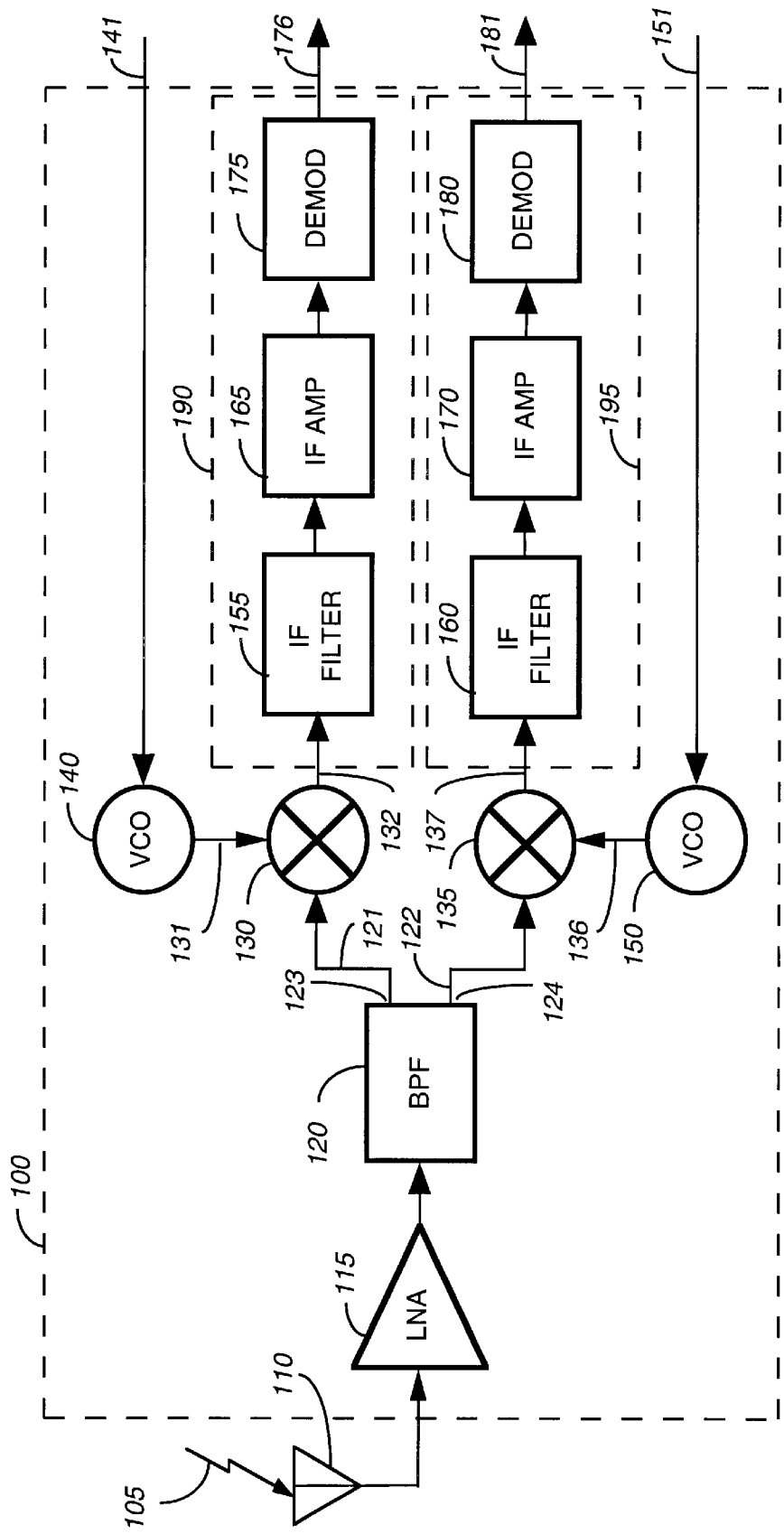
FIG. 1 shows an electrical block diagram of a dual channel receiver, in accordance with the preferred embodiment of the present invention.

Referring to FIG.1, an electrical block diagram of a dual channel receiver 100 is shown, in accordance with the preferred embodiment of the present invention. A conventional antenna 110 intercepts a radio signal 105 and converts it to a conducted signal that is coupled to a conventional low noise amplifier (LNA) that is part of the dual channel receiver 100. The LNA 115 generates an amplified received radio frequency (RF) signal that is coupled to a front end bandpass filter (BPF) 120. The BPF 120 has a front end bandwidth designed to remove most out-of-band energy from the received RF signal while passing in-band energy of the RF signal without substantial diminishment. As an example, the front end bandwidth is 3.0 MHz centered at 930.50 MHz. The BPF 120 also splits the received RF signal into a first signal 121 and a second signal 122 of essentially equal signal strengths. The BPF 120 also provides out of band isolation between first and second outputs 123, 124 at which the first and second signals 121, 122 are provided. This means that an out of band RF signal coupled to the first output 123 will appear at the second output 124 diminished by a significant amount, and vice versa. In accordance with the preferred embodiment of the present invention, the diminishment is at least 6 decibels. The BPF 120 is preferably a surface acoustic wave (SAW) filter designed with the first and second outputs 123, 124 taken at opposite ends of the blank (the substrate) thereby providing the described characteristics of filtering and splitting.

A first radio channel, for example a messaging radio channel having a carrier frequency of CH1, is included in the first signal 121. A second radio channel, for example an information service radio channel having a carrier frequency of CH2, is included in the second signal 122. Preferably, CH2<CH1.

A first mixer 130 is coupled to the first signal 121 and is also coupled to a high side injection signal 131 having an injection frequency, INJ1, outside the front end bandwidth. The first mixer 130 generates a first mixer output signal 132 substantially at a predetermined intermediate frequency (IF). A second mixer 135 is coupled to the second signal 122 and is also coupled to a low side injection signal 136 having an injection frequency, INJ2, outside the front end bandwidth. The second mixer 135 generates a second mixer output signal 137 substantially at the IF. The first and second mixers 130, 135 are of conventional design, and are preferably identical but for differences in their matching circuits to which the injection signals 131, 136 are coupled, when the frequencies of the injection signals 131, 136 are sufficiently different. The injection signals 131, 136 are generated by voltage controlled oscillators (VCOs) 140, 150, and are substantially free from harmonics and other impurities. The frequencies of the injection signals 131, 136 are determined from the frequencies of the first and second radio channels as follows:

INJ1=CH1+IF

INJ2=CH2−IF

The VCOs 140, 150 are controlled by channel select signals 141,151 coupled thereto, and the VCOs 140, 150 are preferably controlled by conventional phase lock loops for which the channel select signals 141, 151 set a divider ratio. The VCOs 140, 150 generate the high side and low side injection signals 131, 136 having injection frequencies substantially at the calculated values, meaning that the injection frequencies differ from the calculated values by normal manufacturing and environmental tolerances of frequency references used by the VCOs 140, 150 that are used to generate the injection frequencies. Accordingly, the first and second mixer output signals 132, 137 are substantially at the IF. In accordance with the preferred embodiment of the present invention, one frequency reference is used for both VCOs 140, 150, but two references could alternatively be used.

Each of the first and second mixer output signals 132, 137 are coupled, respectively, to one of two essentially identical intermediate frequency filters (IF FILTERs) 155, 160 of conventional design. That is, the IF FILTERs 155, 160 have the same bandwidth and gain characteristics, differing only by manufacturing variances. The bandwidth of the IF FILTERs 155, 160 is typically significantly narrower than the front end bandwidth. As a continuation of the example given above, CH1=930.050 MHz and CH2=930.025 MHz. The IF FILTERs are centered at 45.1 MHz with a bandwidth of 17 kHz. The high side and low side injection signals 131, 136 have frequencies of INJ1=975.15 MHz and INJ2=884.925 MHz. Each of the IF FILTERs 155, 160 is coupled to one of the IF amplifiers (IF AMPS) 165, 170, which are, in turn, coupled to one of the demodulators (DEMODs) 175, 180. The IF AMPS 165, 170 are stages of identical conventional design, and the DEMODs 175, 180 are stages of identical conventional design. The DEMODs 175, 180 generate demodulated signals 176, 181 from the signals of the first and second radio channels that have been converted by the mixers 130, 135 into the mixer output signals 132, 137. It will be appreciated that the order of the IF FILTERS 155, 160 and the IF AMPS 165, 170 can be reversed in an alternative design, without substantially affecting the benefits afforded by the present invention.

The dual channel receiver 100 can more generically described as comprising two essentially identical receiver back ends 190, 195, comprising, respectively, IF FILTER 155, IF AMP 165, and DEMOD 175; and IF FILTER 160, IF AMP 170, and DEMOD 180. The mixers 130, 135 are coupled to the injection signals 131, 136 and to the receiver back ends 190, 195.

It will be further appreciated that the use of high side and low side injection in accordance with the preferred embodiment of the present invention substantially reduces interference from one of the injection signals 131, 136 to other parts of the dual channel receiver 100, in comparison to using injections from the same side (high side or low side) for both mixers 130, 135. The reduction comes about in two ways. Interference is first reduced by the frequency difference of the injection signals, which from the formulas above can be seen to be equal to twice the IF plus the channel separation (2*IF+(CH1−CH2)), which is at least 90.2 MHz of separation in the example described. Second, the interference is reduced by the isolation between the first and second outputs of the BPF 120. Any injection signal energy that couples to one of the outputs 123, 124 is reduced by the isolation of the BPF 120 before reaching the opposite mixer RF input as a part of the opposite BPF 120 output signal. These means of interference reduction prevent problems such as a coupling together of the two VCOs 140, 150 that would likely occur if both injection signals 131, 136 were either high side or low side signals, especially when channels having adjacent or close frequencies are selected . Such coupling would produce undesirable effects such as spurious reception of unwanted signals and noise added to desirable signals. It will be appreciated that the dual channel receiver 100 thus provides simultaneous reception of the first and second channels CH1 and CH2 by using cost effective parts that are space efficient. The parts are cost effective because the entire receiver 100 except for the BPF 120 can comprise parts already used in a single channel version receiver, and because the BPF 120 is of simple design. The parts are space effective because extensive shielding does not have to be added to already existing single channel receiver designs.

Figure 2:
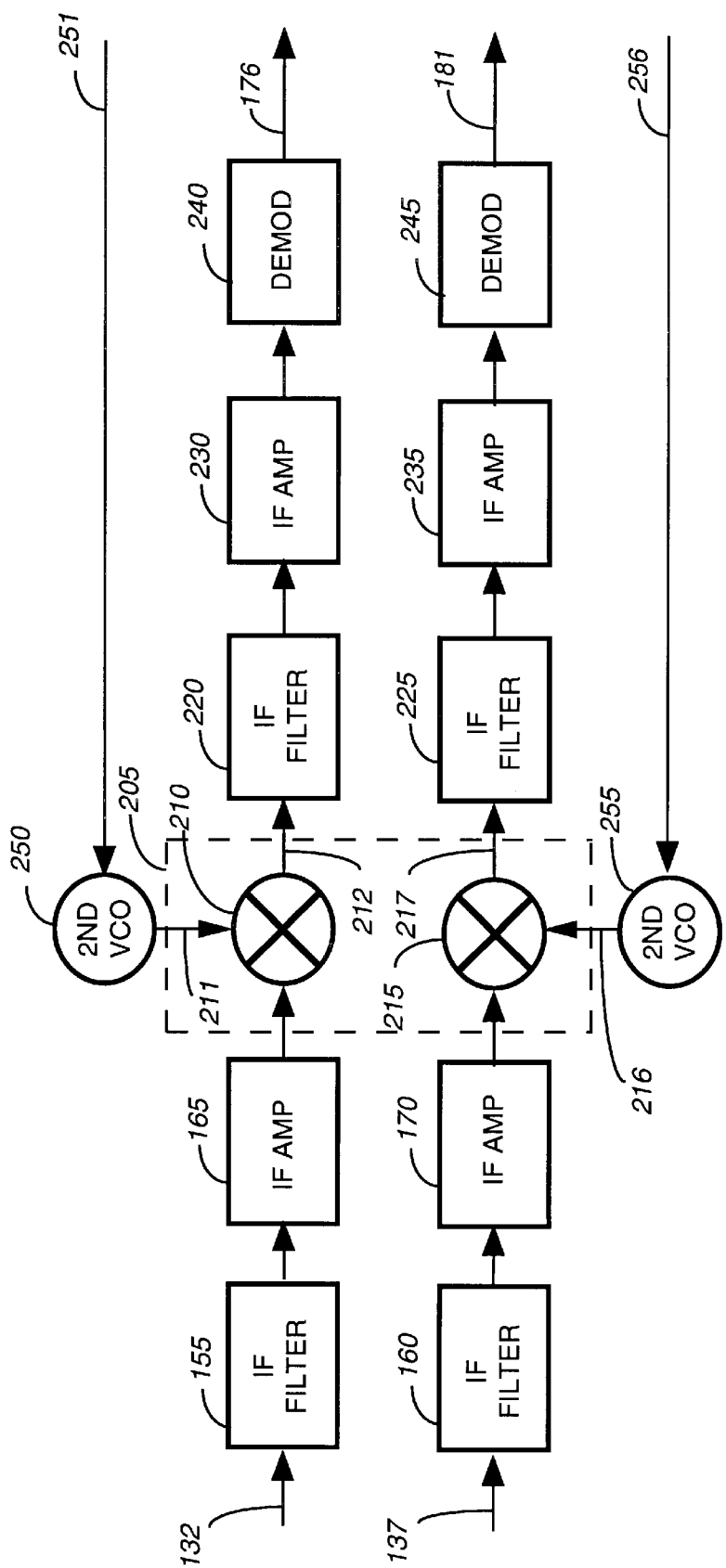
FIG. 2 shows an electrical block diagram of a portion of a dual conversion dual channel receiver, in accordance with a first alternative embodiment of the present invention.

Referring to FIG. 2, an electrical block diagram of a portion of a dual conversion dual channel receiver is shown, in accordance with a first alternative embodiment of the present invention. The dual conversion dual channel receiver comprises the same front end components (the antenna 110, the LNA 115, the BPF 120, the first mixer 130 and the second mixer 135) as the dual channel receiver 100 described with reference to FIG. 1. The dual conversion dual channel receiver further comprises the following back end IF components of the dual channel receiver 100: the IF FILTERs 155, 160 and the IF AMPS 165, 170. The dual conversion, dual channel receiver further comprises a second IF stage 205, comprising a first second stage mixer 210 having a high side second stage injection signal 211 that generates a first second stage mixer output signal 212 substantially at a second predetermined intermediate frequency (IF2) and a second second stage mixer 215 having a low side second stage injection signal 216 that generates a second mixer output signal 217 substantially at the IF2. The first and second mixer output signals 212, 217 are coupled to second IF FILTERs 220, 225 that are of identical design. The high and low side second stage injection signals 211, 216 are generated by second voltage controlled oscillators ($2^{ND}$ VCOs) 250, 255 that are controlled by $2^{ND}$ VCO control signals 251, 256. The second IF FILTERS 220, 225 are coupled, respectively, to IF amplifiers (IF AMPs) 230, 235, which are, in turn, coupled to demodulators (DEMODs) 240, 245, which generate the demodulated signals 176, 181. The architecture of the dual conversion dual channel receiver in accordance with the first alternative embodiment of the present invention can provide reduced interference in receivers that benefit from the use of a dual conversion receiver back end. It will be appreciated that either mixer 210, 255 can be coupled to the high side injection signal 211 with the other mixer coupled to the low side injection signal 216, independently of the choice of high side or low side injections for the first and second mixers 130, 135. A typical center frequency for the second stage IF FILTERs 220, 225 is 455 kHz, with a bandwidth of 25 kHz.

In accordance with a second alternative embodiment of the present invention, the front end band-pass filter is a diplexer filter that filters the first signal 121 differently than the second signal 122. The BPF 120 in this embodiment filters both the first and second signals 121, 122 with bandwidths that are essentially the same, but that have different center frequencies. The use of a diplexer version of the BPF 120 in accordance with the second alternative embodiment of the present invention is beneficial when the first and second channels are planned to be within offset bandwidths, with the effect of diplexer filtering being to further reduce interference the first and second channels under at least some circumstances. An example of one such situation is one in which ten sets of first and second channels exist, each channel being 25 kHz in width, the ten first channels having adjacent frequencies, the second channels having adjacent frequencies, and wherein the ten first channels are centered 250 kHz or more apart from the ten second channels. In this example, the ten first channels carry information service information and the ten second channels carry paging messages, so that the operator of a radio comprising the dual conversion dual channel receiver can select any one of the twenty channels or one of the ten first channels and any one of the ten second channels for simultaneous reception.

Figure 3:
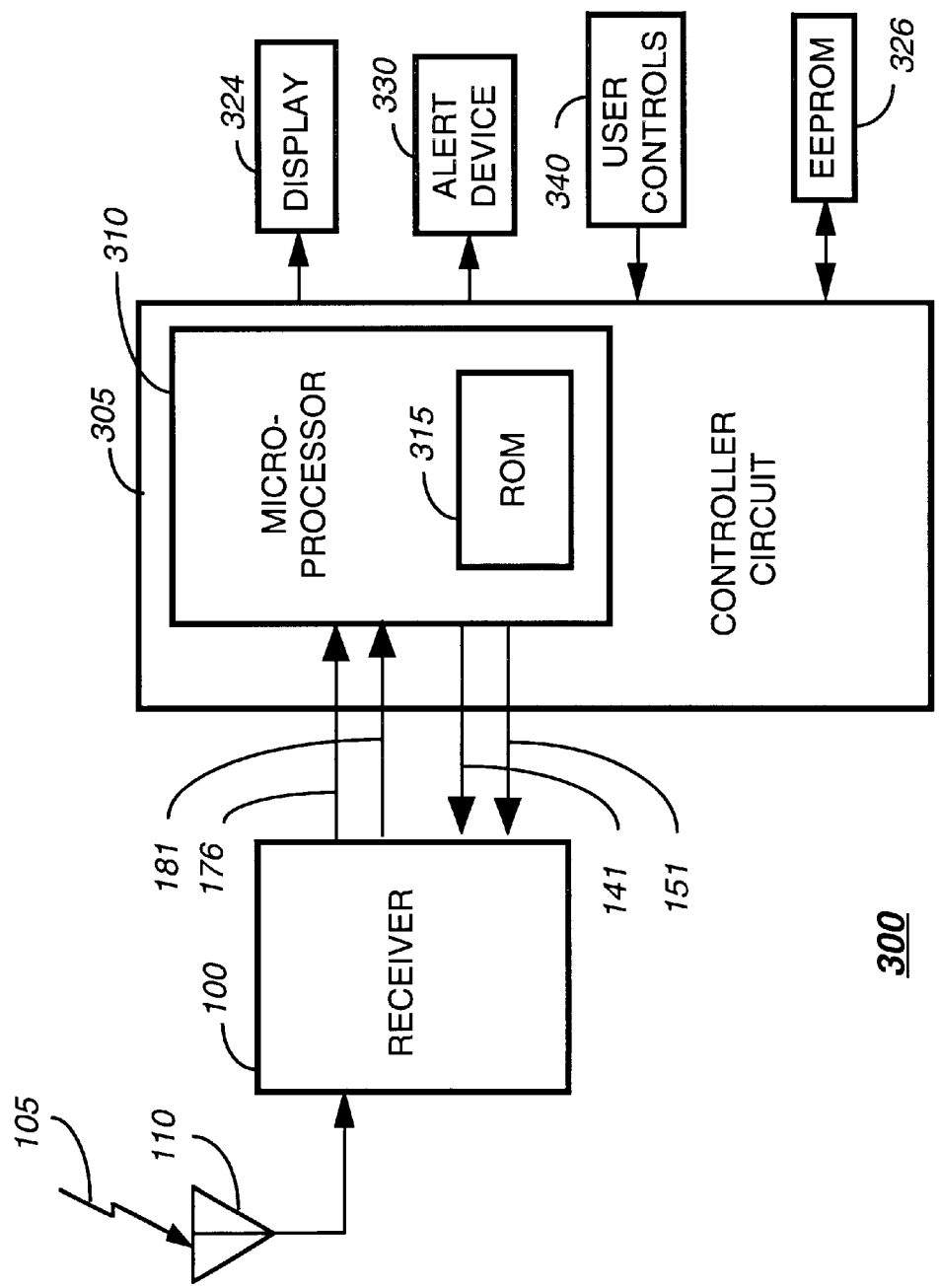
FIG. 3 shows an electrical block diagram of a multichannel selective call radio, in accordance with the preferred embodiment of the present invention.

Referring to FIG. 3, an electrical block diagram of a multichannel selective call radio 300 is shown, in accordance with the preferred embodiment of the present invention. The selective call radio 300 comprises the antenna 110, the dual channel receiver 100, a controller circuit 305. The demodulated signals 176, 181 are coupled to the controller circuit 305. The controller circuit 305 generates the channel select signals 141, 151 that are coupled to the dual channel receiver 100 for setting the frequencies, CH1 and CH2, of the first and second channels. The controller circuit 305 is also coupled to a display 324, an alert 330, a set of user controls 340, and an electrically erasable read only memory (EEPROM) 326. The controller circuit 305 comprises a microprocessor 310, as well as other circuits not shown in FIG. 1, such as power regulation circuits. The microprocessor comprises a read only memory (ROM) 315 that is programmed with program instructions that control the operation of the microprocessor 310.

The microprocessor 310 is coupled through the controller circuit 305 to the EEPROM 326 for storing an embedded address and other configuration information that is stored therein during a maintenance operation, and the microprocessor 310 loads the embedded address during normal operations of the selective call radio 300. The microprocessor 310 is a digital signal processor of conventional circuit design, comprising a central processing unit (CPU), the ROM 315, and a random access memory (RAM).

A unique message processor function of the microprocessor 310 controls the channel select signals 141, 151 to adjust the VCOs 140, 150 according to the equations given with reference to the description of FIG. 1, so as to select the first and second channels and to generate both the mixer output signals 132, 137 at the predetermined intermediate frequency, IF. This unique microprocessor function is provided by a unique segment of conventional programming instructions stored in the ROM 315. The processor 310 decodes information coded within outbound signaling protocols of the first and second channels conveyed by the radio signal 105, and processes an outbound selective call message included in one of the two channels when an address received in an address field of the outbound signaling protocol matches the embedded address stored in the EEPROM 326, in a manner well known to one of ordinary skill in the art for a selective call radio. The processor 310 processes information from an information service that is included in the second of the first and second channels essentially simultaneously, in a manner well known to one of ordinary skill in the art for a selective call radio. An outbound selective call message or information of the information service that has been determined to be for the selective call radio 300 is processed by the message processor function according to the contents of the outbound message or information, and according to modes set by manipulation of the set of user controls 340, in a conventional manner. Typically, an alert signal is generated when an outbound selective call message or information of the information service has been determined to be for the selective call radio 300. The alert signal is coupled to the alert device 330, which is typically either an audible or a silent alerting device.

It will be appreciated that the selective call radio 300 can alternatively comprise a multiple conversion receiver such as the one described with reference to FIG. 2. It will be further appreciated that the selective call radio 300 is representative of any receiving equipment that operates at radio or light wave frequencies that operates in a superheterodyne manner, such as radio receivers, cable receivers and infrared receivers.

By now, it can be seen that a superheterodyne dual channel receiver is described herein for use in receiving equipment. The superheterodyne dual channel receiver is a simple, cost effective, and space efficient receiver that receives two channels simultaneously without introducing internally generated interfering signals that would prevent proper receiving of one or both of the channels, especially when the frequencies of the two channels are adjacent or close.

What is claimed is:

1. A dual channel receiver, comprising:

a front end bandpass filter that has a front end bandwidth, that splits a received signal into a first signal and a second signal of essentially equal signal strengths, and that provides out of band isolation between first and second signal outputs at which the first and second signals are provided;

a first mixer coupled to the first signal and coupled to a high side injection signal having an injection frequency, INJ1, outside the front end bandwidth, the first mixer generating a first mixer output signal substantially at an intermediate frequency (IF);

second mixer coupled to the second signal and counled to a low side injection signal having an injection frequency, INJ2, outside the front end bandwidth, the second mixer generating a second mixer output signal substantially at the IF;

a first second stage mixer having a high side second stage injection signal that generates a first second stage mixer output signal at a second intermediate frequency; and a second second stage mixer having a low side second stage injection signal that generates a second mixer output signal at the second intermediate frequency.

* * * * *